(12) United States Patent
Hedtke

(10) Patent No.: US 8,752,433 B2
(45) Date of Patent: Jun. 17, 2014

(54) DIFFERENTIAL PRESSURE TRANSMITTER WITH PRESSURE SENSOR

(75) Inventor: Robert C. Hedtke, Young America, MN (US)

(73) Assignee: Rosemount Inc., Chanhassen, MN (US)

( * ) Notice: Subject to any disclaimer, the term of this patent is extended or adjusted under 35 U.S.C. 154(b) by 45 days.

(21) Appl. No.: 13/527,075

(22) Filed: Jun. 19, 2012

(65) Prior Publication Data

US 2013/0333440 A1   Dec. 19, 2013

(51) Int. Cl.
*G01L 7/00*   (2006.01)
*G01L 9/00*   (2006.01)

(52) U.S. Cl.
USPC .................... 73/700; 73/715; 73/727; 73/753

(58) Field of Classification Search
None
See application file for complete search history.

(56) References Cited

U.S. PATENT DOCUMENTS

| | | | |
|---|---|---|---|
| 2,533,339 A | 12/1950 | Willenborg | 177/311 |
| 3,012,432 A | 12/1961 | Moore et al. | 73/40 |
| 3,169,402 A | 2/1965 | Baker | 73/407 |
| 3,218,863 A | 11/1965 | Calvert | 73/398 |
| 3,232,712 A | 2/1966 | Stearns | 23/255 |
| 3,249,833 A | 5/1966 | Vosteen | 317/246 |
| 3,374,112 A | 3/1968 | Danon | 117/226 |
| 3,410,135 A | 11/1968 | Reynaud | 73/141 |
| 3,557,621 A | 1/1971 | Ferran | 73/398 |
| 3,561,832 A | 2/1971 | Karrer et al. | 310/9.6 |
| 3,697,835 A | 10/1972 | Satori | 317/246 |
| 3,808,480 A | 4/1974 | Johnston | 317/256 |
| 3,924,219 A | 12/1975 | Braun | 338/34 |
| 4,008,619 A | 2/1977 | Alcaide et al. | 73/398 |
| 4,120,206 A | 10/1978 | Rud, Jr. | 73/718 |
| 4,158,217 A | 6/1979 | Bell | 361/283 |
| 4,161,123 A | 7/1979 | Carpenter | 73/741 |
| 4,168,518 A | 9/1979 | Lee | 361/283 |
| 4,177,496 A | 12/1979 | Bell et al. | 361/283 |

(Continued)

FOREIGN PATENT DOCUMENTS

DE   1 932 899       1/1971
DE   3340834 A1     5/1985

(Continued)

OTHER PUBLICATIONS

International Search Report and Written Opinion of the International Searching Authority dated Jul. 11, 2013, for International Appln. No. PCT/US2013/035605, filed Apr. 8, 2013. 8 pgs.

(Continued)

*Primary Examiner* — Lisa Caputo
*Assistant Examiner* — Jermaine Jenkins
(74) *Attorney, Agent, or Firm* — Westman, Champlin & Koehler, P.A.

(57) ABSTRACT

A process variable transmitter for measuring a pressure of a process fluid includes a first inlet configured to couple to a first process pressure and a second inlet configured to couple to a second process pressure. A differential pressure sensor couples to the first and second inlets and provides an output related to a differential pressure between the first pressure and the second pressure. A first pressure sensor couples to the first inlet and provides an output related to the first pressure. Transmitter circuitry provides a transmitter output based upon the output from the differential pressure sensor and further provides enhanced functionality based upon the output from the first pressure sensor.

20 Claims, 6 Drawing Sheets

(56) References Cited

U.S. PATENT DOCUMENTS

| | | | |
|---|---|---|---|
| 4,227,419 A | 10/1980 | Park | 73/724 |
| 4,244,226 A | 1/1981 | Green et al. | 73/703 |
| 4,287,553 A | 9/1981 | Braunlich | 361/283 |
| 4,332,775 A | 6/1982 | Genequand et al. | 361/283 |
| 4,336,567 A | 6/1982 | Anastasia | 361/283 |
| 4,358,814 A | 11/1982 | Lee et al. | 361/283 |
| 4,370,890 A | 2/1983 | Frick | 73/718 |
| 4,389,895 A | 6/1983 | Rud, Jr. | 73/724 |
| 4,422,125 A | 12/1983 | Antonazzi et al. | 361/283 |
| 4,422,335 A | 12/1983 | Ohnesorge et al. | 73/724 |
| 4,434,451 A | 2/1984 | Delatorre | 361/283 |
| 4,455,874 A | 6/1984 | Paros | 73/704 |
| 4,458,537 A | 7/1984 | Bell et al. | 73/718 |
| 4,466,290 A | 8/1984 | Frick | 73/756 |
| 4,490,773 A | 12/1984 | Moffatt | 361/283 |
| 4,531,415 A | 7/1985 | Orlowski et al. | 73/718 |
| 4,538,466 A | 9/1985 | Kerber | 73/724 |
| 4,542,436 A | 9/1985 | Carusillo | 361/283 |
| 4,558,184 A | 12/1985 | Busch-Vishniac et al. | 381/174 |
| 4,562,742 A | 1/1986 | Bell | 73/718 |
| 4,578,735 A | 3/1986 | Knecht et al. | 361/283 |
| 4,586,108 A | 4/1986 | Frick | 361/283.3 |
| 4,604,901 A | 8/1986 | Kagi | 73/731 |
| 4,623,813 A | 11/1986 | Naito et al. | 310/313 R |
| 4,644,796 A | 2/1987 | Ward | 73/702 |
| 4,670,733 A | 6/1987 | Bell | 338/36 |
| 4,739,666 A | 4/1988 | Hafner et al. | 73/862.66 |
| 4,741,213 A | 5/1988 | Hojoh | 73/702 |
| 4,785,669 A | 11/1988 | Benson et al. | 73/718 |
| 4,829,826 A | 5/1989 | Valentin et al. | 73/718 |
| 4,860,232 A | 8/1989 | Lee et al. | 364/571.04 |
| 4,864,874 A | 9/1989 | Hafner | 73/862.382 |
| 4,875,369 A | 10/1989 | Delatorre | 73/151 |
| 4,878,012 A | 10/1989 | Schulte et al. | 324/60 |
| 4,878,385 A | 11/1989 | Lloyd | 73/704 |
| 4,926,674 A | 5/1990 | Fossum et al. | 73/4 |
| 4,951,174 A | 8/1990 | Grantham et al. | 361/283.1 |
| 4,977,480 A | 12/1990 | Nishihara | 73/724 |
| 4,995,265 A | 2/1991 | Stocker | 73/702 |
| 5,012,677 A | 5/1991 | Shimada et al. | 73/721 |
| 5,094,109 A | 3/1992 | Dean et al. | 73/718 |
| 5,136,885 A | 8/1992 | Liebermann et al. | 73/702 |
| 5,144,841 A | 9/1992 | Brouwers et al. | 73/706 |
| 5,168,419 A | 12/1992 | Delatorre | 361/283 |
| 5,194,819 A | 3/1993 | Briefer | 73/718 |
| 5,230,250 A | 7/1993 | Delatorre | 73/733 |
| 5,233,875 A | 8/1993 | Obermeier et al. | 73/718 |
| 5,291,795 A | 3/1994 | Hafner | 73/862.629 |
| 5,329,818 A | 7/1994 | Frick et al. | 73/708 |
| 5,415,048 A | 5/1995 | Diatschenko et al. | 73/861.04 |
| 5,469,749 A | 11/1995 | Shimada et al. | 73/861.47 |
| 5,471,882 A | 12/1995 | Wiggins | 73/702 |
| 5,492,016 A | 2/1996 | Pinto et al. | 73/724 |
| 5,495,769 A | 3/1996 | Broden et al. | 73/718 |
| 5,524,492 A * | 6/1996 | Frick et al. | 73/706 |
| 5,531,120 A | 7/1996 | Nagasu et al. | 73/706 |
| 5,542,300 A | 8/1996 | Lee | 73/724 |
| 5,637,802 A | 6/1997 | Frick et al. | 73/724 |
| 5,642,301 A | 6/1997 | Warrior et al. | 364/571.02 |
| 5,680,109 A | 10/1997 | Lowe et al. | 340/608 |
| 5,705,978 A | 1/1998 | Frick et al. | 340/511 |
| 5,757,608 A | 5/1998 | Bernot et al. | 361/283.4 |
| 5,760,310 A | 6/1998 | Rud et al. | 73/706 |
| 5,911,162 A | 6/1999 | Denner | 73/718 |
| 5,920,016 A | 7/1999 | Broden | 73/756 |
| 5,969,258 A | 10/1999 | Gerst et al. | 73/718 |
| 5,992,240 A | 11/1999 | Tsuruoka et al. | 73/718 |
| 6,003,219 A | 12/1999 | Frick et al. | 29/25.41 |
| 6,047,244 A | 4/2000 | Rud, Jr. | 702/98 |
| 6,055,863 A * | 5/2000 | Behm et al. | 73/706 |
| 6,236,096 B1 | 5/2001 | Chang et al. | 257/419 |
| 6,250,164 B1 | 6/2001 | O'Brien et al. | 73/730 |
| 6,295,875 B1 | 10/2001 | Frick et al. | 73/718 |
| 6,301,973 B1 | 10/2001 | Smith | 73/861.357 |
| 6,367,333 B1 | 4/2002 | Bullister et al. | 73/715 |
| 6,484,585 B1 | 11/2002 | Sittler et al. | 73/718 |
| 6,508,131 B2 | 1/2003 | Frick | 73/756 |
| 6,520,020 B1 | 2/2003 | Lutz et al. | 73/706 |
| 6,530,282 B1 * | 3/2003 | Kurtz et al. | 73/756 |
| 6,539,807 B1 | 4/2003 | Wohlrab et al. | 73/723 |
| 6,543,291 B1 | 4/2003 | Kurtz et al. | 73/716 |
| 6,564,643 B1 | 5/2003 | Horie et al. | 73/724 |
| 6,568,278 B2 | 5/2003 | Nelson et al. | 73/756 |
| 6,647,794 B1 | 11/2003 | Nelson et al. | 73/718 |
| 6,654,697 B1 | 11/2003 | Eryurek et al. | 702/47 |
| 6,662,662 B1 | 12/2003 | Nord et al. | 73/715 |
| 6,675,655 B2 | 1/2004 | Broden et al. | 73/716 |
| 6,701,274 B1 | 3/2004 | Eryurek et al. | 702/140 |
| 6,828,801 B1 | 12/2004 | Burdick et al. | 324/658 |
| 6,892,582 B1 | 5/2005 | Satou et al. | 73/715 |
| 6,901,101 B2 | 5/2005 | Frick | 372/92 |
| 6,945,582 B2 | 9/2005 | Chen | 73/718 |
| 6,992,492 B2 | 1/2006 | Burdick et al. | 324/658 |
| 7,159,468 B2 * | 1/2007 | Skinner et al. | 73/736 |
| 7,379,629 B1 | 5/2008 | Burns | 385/12 |
| 7,401,522 B2 | 7/2008 | Broden et al. | 73/716 |
| 7,454,975 B2 * | 11/2008 | Louwagie et al. | 73/715 |
| 7,461,562 B2 | 12/2008 | Schumacher | 73/861.42 |
| 7,490,519 B2 * | 2/2009 | Subramanian et al. | 73/716 |
| 7,540,196 B2 | 6/2009 | Kurtz et al. | 73/714 |
| 7,624,642 B2 | 12/2009 | Romo | 73/717 |
| 7,702,478 B2 | 4/2010 | Hedtke et al. | 702/100 |
| 7,954,383 B2 * | 6/2011 | Willcox et al. | 73/718 |
| 8,015,882 B2 * | 9/2011 | Klosinski et al. | 73/756 |
| 8,132,464 B2 | 3/2012 | Broden et al. | 73/716 |
| 2002/0117006 A1 | 8/2002 | Paros et al. | 73/717 |
| 2002/0178822 A1 | 12/2002 | Nelson et al. | 73/700 |
| 2002/0178827 A1 | 12/2002 | Wang | 73/718 |
| 2003/0177837 A1 | 9/2003 | Broden et al. | 73/716 |
| 2004/0015069 A1 | 1/2004 | Brown | 600/407 |
| 2004/0093951 A1 | 5/2004 | Viola et al. | 73/728 |
| 2004/0168523 A1 | 9/2004 | Fernald et al. | 73/861.01 |
| 2004/0233458 A1 | 11/2004 | Frick | 356/480 |
| 2005/0005712 A1 | 1/2005 | Gysling et al. | 73/861.23 |
| 2005/0011278 A1 | 1/2005 | Brown et al. | 73/861.18 |
| 2005/0041375 A1 | 2/2005 | Rosenau | 361/524 |
| 2005/0063444 A1 | 3/2005 | Frick | 372/92 |
| 2005/0097963 A1 | 5/2005 | Wilda | 73/716 |
| 2005/0132808 A1 | 6/2005 | Brown et al. | 73/592 |
| 2006/0070448 A1 | 4/2006 | Baumann et al. | 73/730 |
| 2006/0206288 A1 | 9/2006 | Brahmajosyula et al. | 702/183 |
| 2006/0232281 A1 | 10/2006 | Vittorio et al. | 324/652 |
| 2006/0278005 A1 | 12/2006 | Broden et al. | 73/716 |
| 2006/0278007 A1 | 12/2006 | Harasyn et al. | 73/723 |
| 2007/0220985 A1 | 9/2007 | Hedtke | 73/715 |
| 2008/0006094 A1 | 1/2008 | Schulte et al. | 73/736 |
| 2010/0010755 A1 | 1/2010 | Paulitsch | |

FOREIGN PATENT DOCUMENTS

| | | |
|---|---|---|
| DE | 43 33 753 | 5/1994 |
| EP | 0 423 903 A2 | 6/1985 |
| EP | 021393 | 11/1988 |
| EP | 0 524 550 A1 | 1/1993 |
| EP | 1 026 493 A2 | 8/2000 |
| FR | 941804 | 1/1949 |
| GB | 1530952 | 3/1976 |
| GB | 2178536 | 2/1987 |
| JP | 2005280536 | 10/2005 |
| WO | WO 93/04343 | 3/1993 |
| WO | WO 93/04349 | 3/1993 |
| WO | WO 99/53286 | 10/1999 |
| WO | WO 01/59418 | 8/2001 |
| WO | WO 01/59419 | 8/2001 |
| WO | WO 02/23148 | 3/2002 |
| WO | WO 2005/033643 | 4/2005 |
| WO | WO 2006/092052 | 9/2006 |
| WO | WO 2007/019676 | 2/2007 |

OTHER PUBLICATIONS

International Search Report and Written Opinion for PCT Application No. PCT/US2011/038692, dated Oct. 7, 2011, 10 pages.

(56) References Cited

OTHER PUBLICATIONS

Notification of Transmittal of the International Search Report and Written Opinion of the International Searching Authority, or the Declaration for International Application No. PCT/US2009/064712, filed Nov. 17, 2009, 14 pages.
Notification of Transmittal of the International Search Report and the Written Opinion of the International Searching Authority, or the Declaration for International Application No. PCT/US2009/064705, filed Nov. 17, 2009, 16 pages.
Notification of Transmittal of the International Search Report and the Written Opinion of the International Searching Authority, or the Declaration for International Application No. PCT/US2009/064716, filed Nov. 17, 2009, 13 pages.
"International Search Report" for PCT Application No. PCT/US2006/036404, filed Sep. 19, 2006, 3 pages.
Notification of Transmittal of the International Search Report and the Written Opinion of the International Searching Authority, or the Declaration for PCT/US2006/036404, filed Sep. 19, 2006, 2 pages.
Written Opinion for PCT Application No. PCT/US2006/036404, filed Sep. 19, 2006, 6 pages.
Notification of Transmittal of the International Search Report and the Written Opinion of the International Searching Authority, or the Declaration for PCT/US2006/046742, filed Jul. 12, 2006, 11 pages.
Notification of Transmittal of the International Search Report and the Written Opinion for PCT Application No. PCT/US2007/012050.
Notification of Transmittal of the International Search Report and the Written Opinion of the International Searching Authority, or the Declaration of PCT/US2006/020254.
Notification of Transmittal of the International Search Report and the Written Opinion of the International Searching Authority, or the Declaration for PCT/US2006/019955.

* cited by examiner

# DIFFERENTIAL PRESSURE TRANSMITTER WITH PRESSURE SENSOR

BACKGROUND OF THE INVENTION

The present invention relates to measurement of pressures of process fluids in industrial processes. More specifically, the present invention relates to measuring line pressure in a differential pressure transmitter.

Industrial processes are used in the manufacturing and transport of many types of materials. In such systems, it is often required to measure different types of pressure within the process. One type of pressure which is frequently measured is a differential pressure. This is the pressure difference between one point in the process and another point in the process. For example, the differential pressure across an orifice plate in a pipe containing a flow of process fluid is related to the flow rate of the fluid. Differential pressures can also be used, for example, to measure height of a process fluid in a tank or other container.

In industrial processes, pressure sensors are typically contained in, or coupled to, a pressure transmitter which is located at a remote location and transmits pressure related information back to a centralized location such as a control room. The transmission is frequently over a process control loop. For example, a two-wire process control loop is often used in which two wires are used to carry both information as well as power to the transmitter. Wireless process control loops may also be used.

Advancements in transmitter technology have increased the amount of information that can be produced by a transmitter. In particular, transmitters can be equipped with multiple sensors to measure multiple process variable inputs or a wider range of a single process variable. For example, transmitters can be provided with multiple pressure sensors as described in U.S. Pat. No. 5,495,769 to Broden et al., U.S. Pat. No. 6,047,244 to Rud, Jr. and U.S. Pat. No. 7,467,555 to Schulte et al., all of which are assigned to Rosemount Inc., Chanhassen, Minn.

In many process installations, in addition to measuring a differential pressure, it is also desirable to measure an absolute or gauge pressure (also referred to as "line pressure") of the process. This information can be used, for example, to provide more accurate flow measurements by including changes in density of the process fluid in the flow calculations. The additional pressure measurements can be made using a separate pressure sensor.

SUMMARY OF THE INVENTION

A process variable transmitter for measuring a pressure of a process fluid includes a first inlet configured to couple to a first process pressure and a second inlet configured to couple to a second process pressure. A differential pressure sensor couples to the first and second inlets and provides an output related to a differential pressure between the first pressure and the second pressure. A first pressure sensor couples to the first inlet and provides an output related to the first pressure. Transmitter circuitry provides a transmitter output based upon the output from the differential pressure sensor and further provides enhanced functionality based upon the output from the first pressure sensor.

DETAILED DESCRIPTION OF ILLUSTRATIVE EMBODIMENTS

In one embodiment, the present invention provides an apparatus and method for providing enhanced functionality to a differential pressure measurement transmitter using at least one line pressure sensor. More specifically, in one aspect, the present invention includes a line pressure sensor which is coupled directly to a process pressure for use in performing diagnostics or providing other functionality. The pressure sensor is coupled directly to the process fluid through a direct coupling passageway which couples to the process fluid. The passageway can be located in a flange which is used to connect the pressure transmitter to process fluid or, alternatively, the passageway can be formed within the pressure transmitter itself.

Figure 1:
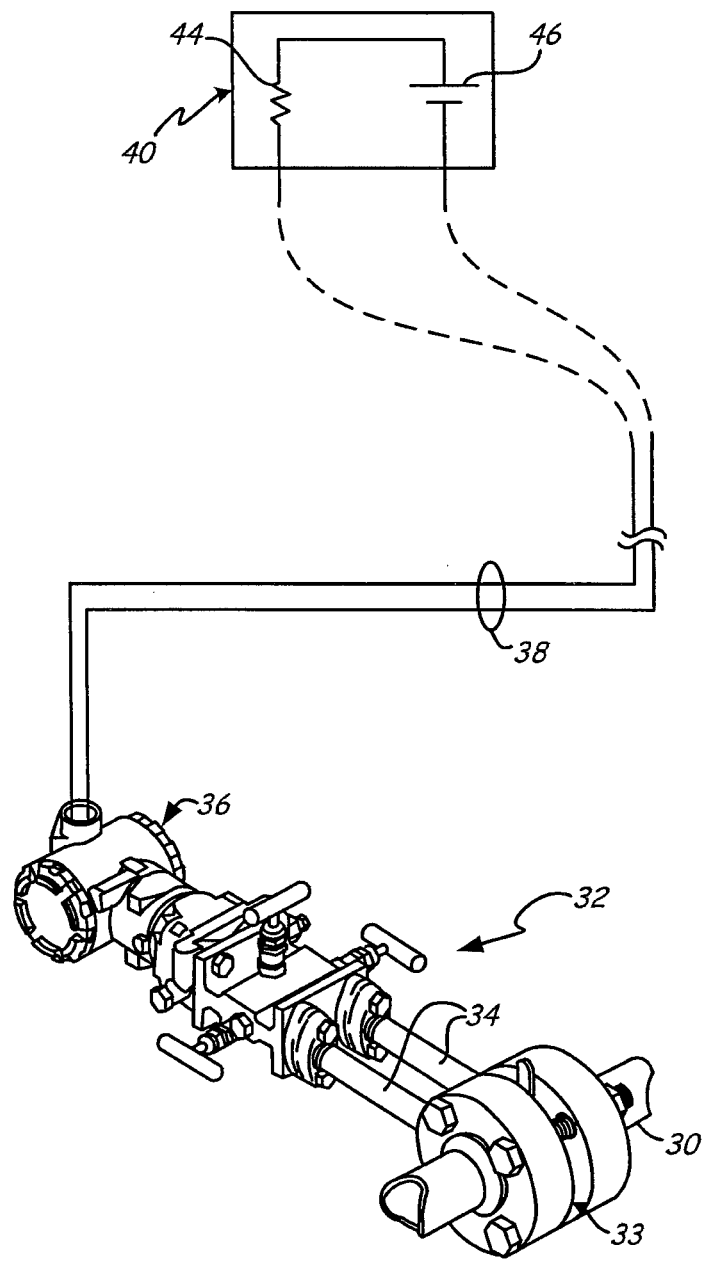
FIG. 1 shows a process measurement system with a process transmitter constructed in accordance with the present invention.

FIG. 1 shows generally the environment of a process measurement system 32. FIG. 1 shows process piping 30 containing a fluid under pressure. The process measurement system 32 includes impulse piping 34 which couples process piping 30 to a process pressure transmitter 36. A primary element 33, such as an orifice plate, venturi tube, flow nozzle, and so on, contacts the process fluid at a location in the process piping 30 between the pipes of the impulse piping 34. The primary element 33 causes a pressure change in the fluid as it flows past the primary element 33 which is sensed by transmitter 36 and is related to the flow rate.

Process control loop 38 can provide both power to the transmitter 36 from a control room 40 and bi-directional communication, and can be operated in accordance with a process communication protocol. In the illustrated example, the process loop 38 is a two-wire loop. The two-wire loop is used to transmit all power to and all communications to and from the transmitter 36 during normal operations with a 4-20 mA signal. Control room 40 includes a power supply 46 and a series resistance 44. In another example configuration, loop 38 is a wireless connection in which data may be transmitted and/or received wirelessly in a point-to-point configuration, a mesh network, or other configuration with the transmitter 36 having its own power source.

Figure 2:
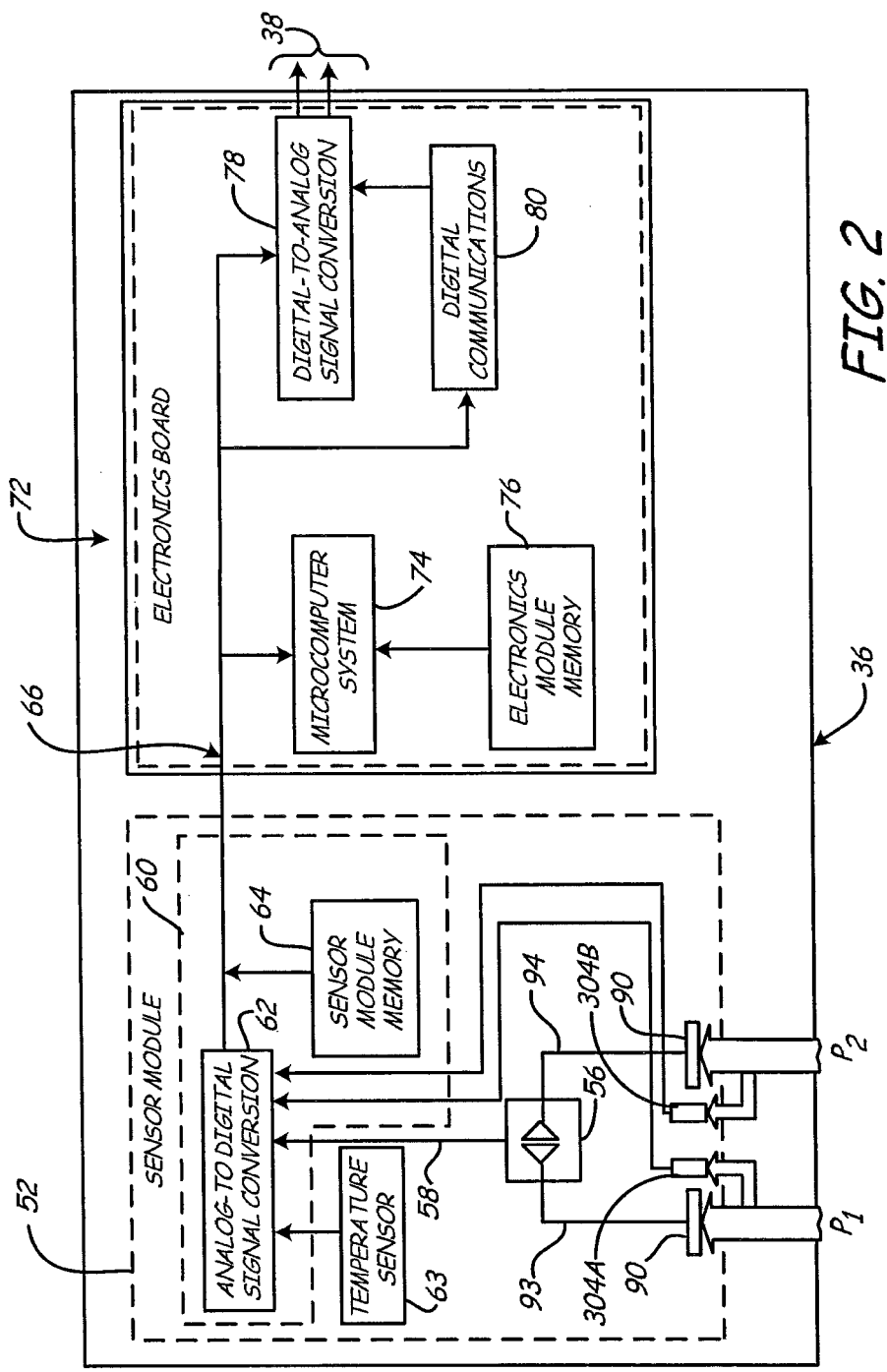
FIG. 2 is simplified block diagram of the process transmitter of FIG. 1.

FIG. 2 is a simplified block diagram illustrative of pressure transmitter 36. Pressure transmitter 36 includes a sensor module 52 and an electronics board 72 coupled together through a databus 66. Sensor module electronics 60 includes a differential pressure sensor 56 which receives a pressures $P_1$ and $P_2$ of the process fluid and provides an output 58 related to the differential pressure to an analog to digital converter 62. An optional temperature sensor 63 is also illustrated along with sensor module memory 64. Electronics board 72 includes a microcomputer system or microprocessor 74, electronics module memory 76, digital to analog signal converter 78 and digital communication block 80.

Also illustrated in FIG. 2 are capillary or "fill" tubes 93 and 94 which are used to couple the differential pressure sensor 56 to the process fluid 54. Isolation diaphragms 90 receive pressures $P_1$ and $P_2$ from the process fluid which are responsively applied to a fill fluid carried in capillary tubes 93 and 94. Through this fill fluid, the pressures of the process fluid are applied to the differential pressure sensor 56.

In accordance with the illustrated embodiment, line pressure sensors 304A and 304B directly couple to pressures $P_1$ and $P_2$, respectively, and provide outputs related to the pressures and to analog to digital conversion circuitry 62. Microprocessor system 74 can monitor line pressure $P_1$ and $P_2$. Pressure sensors 304A and 304B may operate in accordance with known techniques including pressure measurement techniques in which an electrical capacitance of the sensors 304A and 304B changes, an electrical resistance changes, a resonant frequency changes, etc. One specific configuration is discussed below in more detail.

Figure 3A:
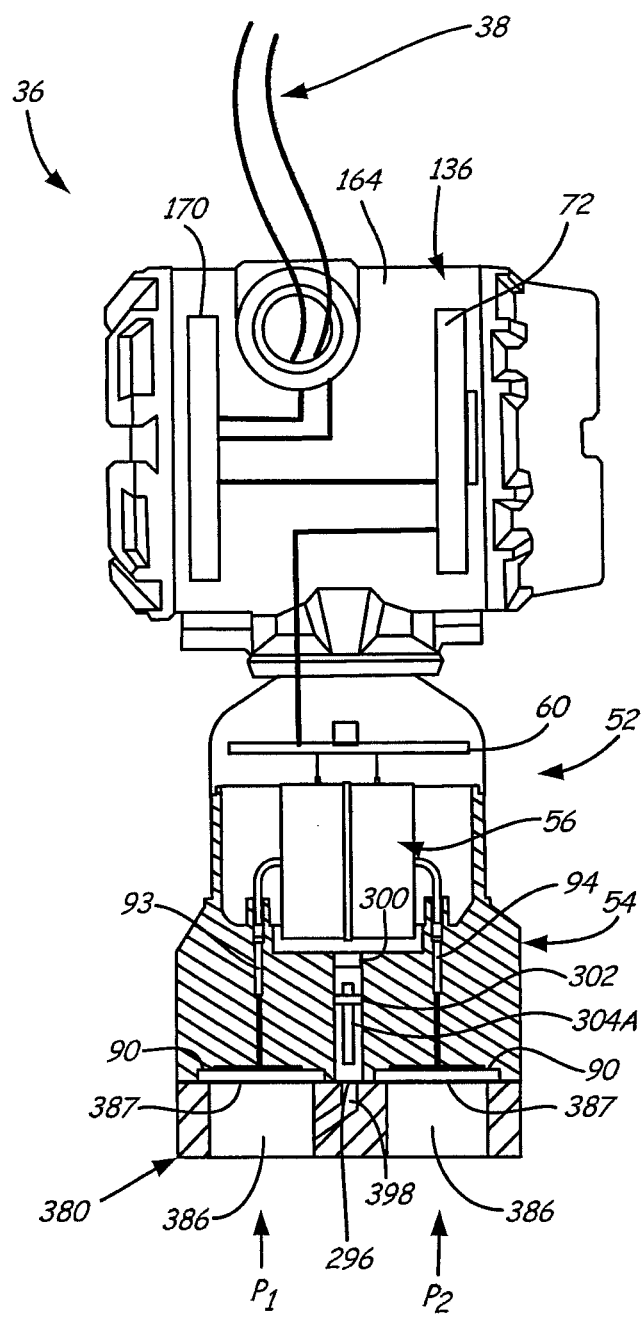
FIG. 3A is a schematic side view of the process transmitter of FIG. 1

FIG. 3A schematically shows one embodiment of pressure transmitter 36 having sensor module 52 and transmitter electronics module 136. Sensor module 52 includes housing 54 in which is disposed electronics 60, differential pressure sensor 56, isolation or fill tubes 93 and 94 and isolation diaphragms 90. Sensor module 52 also includes line pressure sensors 304A and 304B (not shown in FIG. 3A). Transmitter electronics module 136 includes housing 164, output interface 170 and electronics board 72.

In the illustrated embodiment, sensor 56 is a capacitance-based differential pressure cell having a sensing diaphragm disposed between a pair of electrode plates. Sensor 56 is connected to pressure $P_1$ and $P_2$ through base 54 with isolation tubes 93 and 94, in which is disposed a hydraulic fill fluid. Isolation diaphragms 90 separate the fill fluid within isolation tubes 93 and 94 from the process fluid but transfer pressures $P_1$ and $P_2$ therebetween. Changes in pressures $P_1$ and $P_2$ of process fluid are sensed as a differential pressure $\Delta P$ by sensor 56. The invention is not limited to this differential pressure measurement configuration.

Figure 3B:
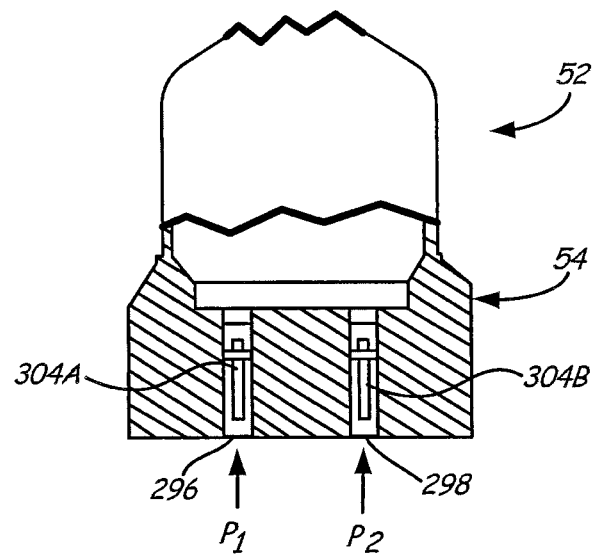
FIG. 3B is a side view cross sectional view of a sensor module rotated 90 degrees.

According to this embodiment, sensor module 52 includes line pressure sensor 304A which is carried within the body of module 52. Further, FIG. 3B is a cross-sectional view of sensor module 52 rotated 90° with respect to FIG. 3A. In FIG. 3B, both sensors 304A and 304B are visible. In FIG. 3A, sensor 304A is carried in a cavity in the module 52 which is sealed by a secondary pressure seal 300. A pressure feed through 302 is also shown. Pressure feedthrough 302 supports the sensor 304A in the cavity. In the configuration of FIGS. 3A and 3B, the pressure sensors 304A and 304B are configured to be directly exposed to process fluid through a direct coupling or port 296, 298. In some configurations, the second pressure sensor 304B is provided for coupling to a second pressure. The pressure sensors 304A,B couple to electronic circuitry 60 of the transmitter.

FIG. 3A also shows a flange 380 used for coupling the transmitter 36 to a process fluid. Flange 380 is described below in greater detail in connection with FIG. 6 and includes pressure inlet ports 386 which are positioned to apply process pressures $P_1$ and $P_2$ to diaphragms 90 through primary (or differential) pressure outlet ports 387. Further, flange 380 includes secondary pressure outlet ports 396 and 398 (see FIG. 6) for coupling pressures $P_1$ and $P_2$ directly to sensors 304A and 304B through direct coupling passageways 400 and 402, respectively.

In the described embodiment, line pressure sensors 304A and 304B are capacitance-based absolute pressure sensors. In one configuration, sensors 304A and 304B operate as described in U.S. Pat. No. 6,484,585 to Sittler et al. and the related series of patents, all of which are assigned to Rosemount Inc., Chanhassen, Minn. Such sensors include technology that uses brittle sensing materials having high compression strength. One suitable brittle material is sapphire. To provide enhanced functionality to the transmitter, the pressures $P_1$ and $P_2$ sensed by pressure sensors 304A and 304B can be compared to one another to produce a signal representative of the differential pressure $\Delta P$ that can be used in place of, or for comparison to, the differential pressure $\Delta P$ sensed by sensor 56. The difference between the outputs from sensors 304A and 304B can also be used to determine large differential pressures, perform diagnostics, provide calibration to sensor 56, or provide other functionality. Sensors 56, 304A and 304B can thus be used in a wide variety of scenarios to sense line pressures and differential pressures and provide enhanced functionality to the transmitter.

Figure 4:
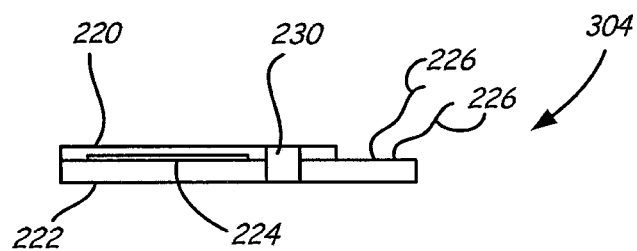
FIG. 4 is a cross sectional view of a line pressure sensor.

FIG. 4 is a side cross sectional view of one example of line pressure sensor 304. In the example of FIG. 4, line pressure sensor 304 is formed of two sapphire substrates 220 and 222 which are bonded together and form a vacuum cavity 224 there between. Vacuum cavity 224 includes two capacitor plates (not shown) which couple to electrical connection leads 226. Electrical connection leads 226 connect to circuitry in sensor board 156. A braze band 230 is provided and is used for coupling the sensor 304 to the housing.

Referring back to FIG. 2, the sensor signals from pressure sensors 56, 304A and 304B are received by circuitry in transmitter 36. This circuitry includes, for example, circuitry in the sensor module 52 or on the electronics board 72. For example, microprocessor circuitry 74 can process the line pressure signals to provide enhanced functionality to the transmitter 36. Such enhanced functionality includes diagnostics, extended measurement range, redundant sensor measurements, calibration, calculation of additional process variables such as mass flow rate, etc.

The additional pressure sensors 304A, 304B can be used to extend the range over which the device is capable of sensing pressure. For example, the line pressure sensors 304A and 304B can be used to determine the differential pressure of the process fluid in instances when the differential pressure exceeds the upper range limit of pressure sensor 56. Although such a configuration may reduce the accuracy of the differential pressure measurements, in some instances this tradeoff may be acceptable in order to provide the increased measurement range.

The sensors 304A, 304B can be used to enable redundant differential pressure measurements for use in providing sensor diagnostics. The differential pressure measured using line sensors 304A and 304B can be compared with differential pressure measured using differential pressure sensor 56. Microprocessor 74 uses differences between these two measurements to identify a failing sensor.

In one configuration, pressure sensors 304A and 304B are used to provide differential pressure measurements if the differential pressure sensor 56 has failed or is providing an inaccurate measurement. This configuration allows the transmitter 36 to operate in a limited (or "limp") mode having a reduced accuracy until the failed equipment can be repair or replaced. If microprocessor system 74 detects that sensor 56 has failed, the microprocessor 74 can calculate differential pressure based upon the outputs from sensors 304A and 304B. Because sensors 304A, 304B couple directly to the process fluid, they can continue to operate even if one of the isolation diaphragms 90 or tubes 93, 94 fail. Diagnostic information such as information which indicates that the transmitted process variable has a reduced accuracy because the transmitter is operating in a "limp" mode can also be provided. This configuration allows the industrial process to continue operation, perhaps at a reduced capacity, until repairs can be implemented.

In another configuration, diagnostics are performed by microprocessor system 74 on the pressure sensors 304A, 304B based upon the differential pressure measured by differential pressure sensor 56. During normal operation, the pressure measured by one of the pressure sensors 304A, 304B should be substantially equal to a sum or difference between the pressure measured by the other line pressure sensor 304A, 304B and the differential pressure measured by differential pressure sensor 56. Similarly, the sensors 304A, 304B can be used to identify a plugging of impulse piping or a failing primary element.

In the embodiments described, the use of two different types of sensors may also be used to provide sensors having different frequency responses. For example, a metal diaphragm used in differential pressure sensor 56 operates as a low pass filter that tends to filter out higher frequency process noise in the pressures applied to the sensor 56. On the other hand, the sapphire based line pressure sensors 304A, 304B have a higher frequency response and are capable of providing faster measurements. This high frequency response can be used to measure noise signals on either side of the differential pressure sensor 56. This can be used to provide enhanced process statistics or diagnostics, such as identifying a plugged impulse line or other failing component in the process. The line pressure signals can also be used to calibrate the differential pressure sensor 56 as well as be used to compensate the differential pressure measurement for any changes due to high line pressure. For example, the configuration of pressure sensors 304A and 304B described above offers relatively stable measurements over an extended time period. As the sensors 304A and 304B are relatively stable, their measurements can be used to calibrate drift in the measurements provided by pressure sensor 56. Thus, calibration can be performed by microprocessor 74. In another example, the additional pressure measurements provided by line pressure sensors 304A and 304B can be used to provide line pressure compensation by microprocessor 74 to differential pressure sensor 56 pressure measurements. In one configuration, the use of two absolute or line pressure sensor measurements can be used to more accurately compensate for variations of the differential pressure measurements. Compensation algorithms can be implemented in microprocessor 74 based upon calibration information stored in memory 76 in FIG. 2.

In one configuration, the line pressure sensors 304A and 304B have an upper range limit of about 5,000 psi. As the line pressure sensors 304A, 304B described herein operate based upon capacitance variation, various operations and components of the measurement system may be shared with the differential pressure sensor 56, such as temperature sensor 63 shown in FIG. 2, which may also operate based upon capacitance variations. In one embodiment, a temperature sensor (not shown) is provided within sensor 304A and/or 304B. This can be used to compensate for temperature variations in pressure measurements. Further, a reference capacitor (not shown) can be implemented in sensor 304A and/or 304B to further enhance accuracy of absolute pressure measurements.

Figure 5:
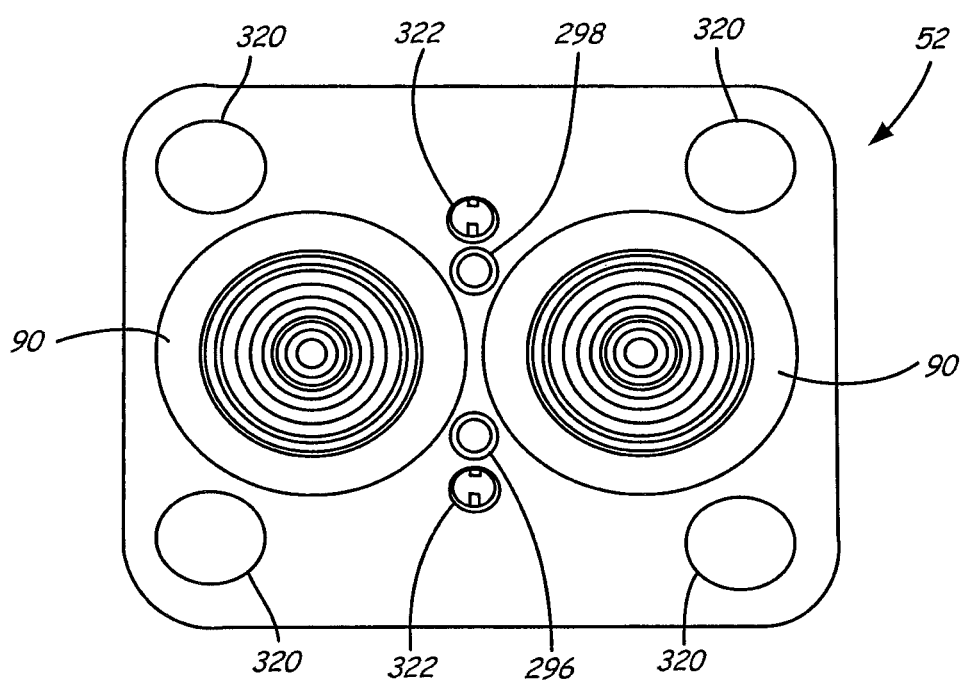
FIG. 5 is a bottom plan view of the pressure sensor module of FIG. 3.

FIG. 5 is a bottom plan view of the sensor module 52 and illustrates direct pressure couplings or ports 296 and 298. Direct coupling ports 296,298 connect to cavities in module 52, which carry sensors 304A,B and include an O-ring or other type of seal. The bottom face of pressure module 52 includes bolt holes 320 configured to couple to flange 380 (shown in FIG. 6). Additional threaded holes 322 are illustrated for coupling to the flange. The couplings 296 and 298 are used for coupling to pressures $P_1$ and $P_2$.

Figure 6:
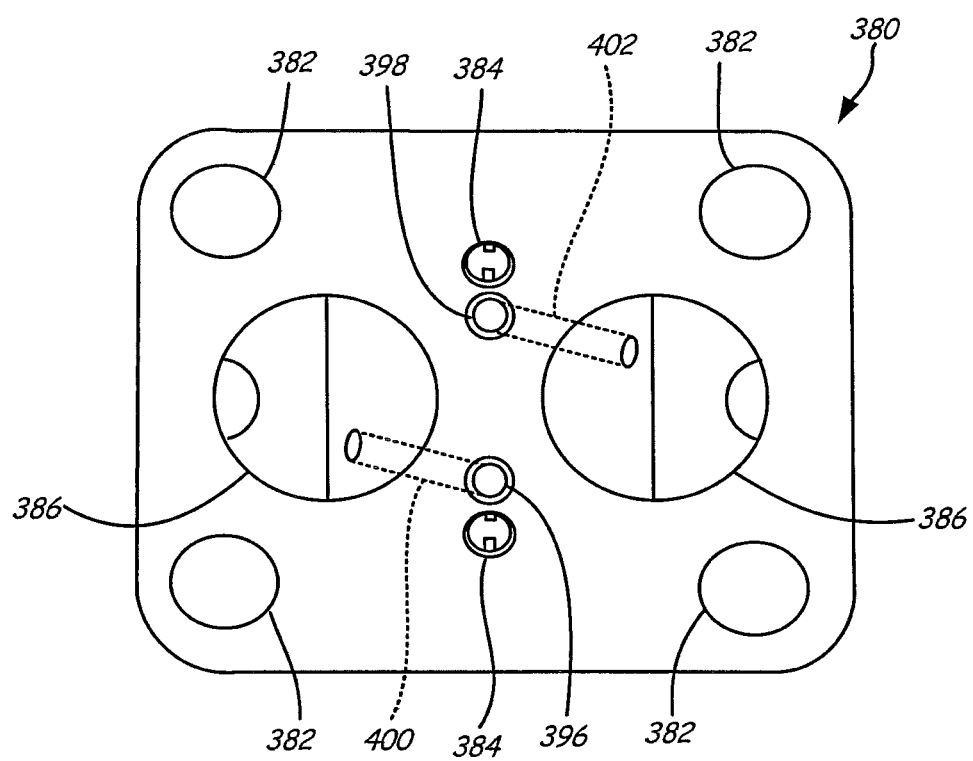
FIG. 6 is a top plan view of a flange configured to couple to the pressure sensor module of FIG. 5.

According to one embodiment, FIG. 6 is a top plan view of a flange 380 configured to mount to the bottom face of sensor module 52 shown in FIG. 5. Flange 380 includes bolt holes 382 configured to be mounted to bolt holes 320 shown in FIG. 5. Similarly, holes 384 are positioned to mount with threaded holes 322 shown in FIG. 5. Pressure inlet ports 386 are positioned to apply process pressures to diaphragms 90 shown in FIG. 5. Additionally, flange 380 includes pressure secondary outlet ports 396 and 398 configured to couple to process direct couplings 296 and 298 shown in FIG. 5. Interior direct coupling passageways 400 and 402 couple ports 396 and 398, respectively, to pressure ports 296,298.

In the present invention, absolute pressure sensors are arranged to measure process pressures directly without an intermediary diaphragm or fill fluid. Thus, should a diaphragm fail, the absolute pressure sensors are capable of continued operation. In the above examples, the direct coupling passageways are formed in the flange. However, in another example configuration, the direct coupling passageways are formed within sensor module 52 and extend from a location proximate diaphragms 90 to the cavities that carry sensors 304A and 304B.

Although the present invention has been described with reference to preferred embodiments, workers skilled in the art will recognize that changes may be made in form and detail without departing from the spirit and scope of the invention. The line pressures sensors can be coupled to $P_1$ and $P_2$ in any appropriate manner and is not limited to the configurations shown herein. The various functions described above can be implemented using any appropriate circuitry and the implementation of such functionality can be shared between components and implemented using the same or separate circuitry. As used herein "transmitter circuitry" refers to any circuitry within transmitter 36. As used herein, "enhanced functionality" includes system diagnostics, component diagnostics, process diagnostics, transmitter diagnostics, sensor diagnostics, extended operation range, calibration of components, statistical process measurements and limited device operation in the event of a component failure. With the present invention, at least one absolute sensor is coupled to a process pressure in a pressure transmitter. The additional pressure sensor directly couples to the process pressure through an opening which is used to couple the differential pressure sensor to process fluid. In one configuration, a diaphragm is provided which separates the process fluid from the differential pressure sensor by sealing an isolation fluid on one side of the diaphragm which transfers the process fluid pressure to the differential pressure sensor. In such a configuration, the additional pressure sensor can be directly coupled to the process fluid on the side of the isolation diaphragm exposed to the process fluid. In such a configuration, the additional sensor couples to the process fluid on the process fluid side of the diaphragm. In this configuration, the additional sensor is directly exposed to process fluid.

What is claimed is:

1. A process variable transmitter for measuring a pressure of a process fluid, comprising:
  a first inlet configured to couple to a first process pressure and a second inlet configured to couple to a second process pressure;
  a differential pressure sensor fluidically coupled to the first and second inlets having an output related to a differential pressure between the first pressure and the second pressure;
  a first pressure sensor fluidically coupled to the first inlet having an output related to the first pressure, wherein the first pressure sensor couples directly to the process fluid; and transmitter circuitry configured to provide a transmitter output based upon the output from the differential pressure sensor and further provide enhanced functionality based upon the output from the first pressure sensor.

2. The process variable transmitter of claim 1 where in the first pressure sensor comprises a brittle material having a cavity formed therein and wherein the output from the first pressure sensor is related to deformation of the cavity.

3. The process variable transmitter of claim 1 wherein the transmitter is configured to calculate differential pressure based upon the output from the first pressure sensor.

4. The process variable transmitter of claim 1 wherein the first pressure sensor has a frequency response which is greater than a frequency response of the differential pressure sensor.

5. The process variable transmitter of claim 1 wherein the enhanced functionality includes detecting a plugged impulse line.

6. The process variable transmitter of claim 1 including a second pressure sensor coupled to the second inlet and having an output related to the second pressure.

7. The process variable transmitter of claim 6 wherein the enhanced functionality includes calibrating the differential pressure sensor based upon outputs from the first and second pressure sensors.

8. The process variable transmitter of claim 6 wherein enhanced functionality includes diagnosing operation of the differential pressure sensor based upon the outputs from the first and second pressure sensors.

9. The process variable transmitter of claim 1 including a flange, wherein the flange includes at least a portion of the first and second inlets and further includes a direct coupling passageway which couples the first pressure sensor to the first inlet.

10. The process variable transmitter of claim 1 including first and second isolation diaphragms which separate process fluid at the first and second inlets from the differential pressure sensor, whereby the process fluid is on a first side of the diaphragms and a fill fluid is on a second side of the diaphragms, and the fill fluid transfers the first and second pressures to the differential pressure sensors.

11. The process variable transmitter of claim 1 including a direct coupling passageway between the first inlet and the first pressure sensor within a body of the process variable transmitter.

12. A method of measuring a pressure of a process fluid in a process variable transmitter, comprising:
 coupling a first passageway to a first process pressure;
 coupling a second passageway to a second process pressure;
 sensing a differential pressure between the first process pressure and the second process pressure using a differential pressure sensor in the process variable transmitter fluidically coupled to the first and second passageways;
 sensing the first process pressure with a first pressure sensor fluidically coupled directly to the process fluid in the first passageway;
 providing a transmitter output related to the differential pressure sensed by the differential pressure sensor; and
 providing enhanced functionality to the process variable transmitter based upon an output from the first pressure sensor.

13. The method of claim 12 wherein the first pressure sensor comprises a brittle material having a cavity formed therein and wherein the output from the first pressure sensor is related to deformation of the cavity.

14. The method of claim 12 including sensing the second pressure with a second pressure sensor and calculating a differential pressure based upon outputs from the first and second pressure sensors.

15. The method of claim 12 including detecting line plugging based upon the sensed first process pressure.

16. The method of claim 12 including diagnosing operation of the differential pressure sensor based upon the sensed first process pressure.

17. The method of claim 12 including calibrating the differential pressure sensor based upon the sensed first process pressure.

18. The method of claim 12 wherein the first and second passageways are formed in a flange.

19. A process variable transmitter for measuring a pressure of a process fluid, comprising:
 a first isolation diaphragm configured to couple to a first process pressure and a second isolation diaphragm configured to couple to a second process pressure;
a differential pressure sensor fluidically coupled through a fill fluid to the first and second isolation diaphragms having an output related to a differential pressure between the first pressure and the second pressure;
a first pressure sensor fluidically coupled directly to the process fluid having an output related to the first pressure;
 transmitter circuitry configured to provide a transmitter output based upon the output from the differential pressure sensor and the output from the first pressure sensor; and
 a flange having a first inlet which couples the first process pressure to the first diaphragm and a second inlet which couples the second process pressure to the second diaphragm, the flange further including a first internal passageway which couples the first inlet to the first pressure sensor.

20. The process variable transmitter of claim 19 wherein the flange includes a second internal passageway which couples the second inlet to a second pressure sensor disposed within the process variable transmitter.

\* \* \* \* \*